Patented May 15, 1928.

1,669,974

UNITED STATES PATENT OFFICE.

ARTHUR P. CUMMINS, OF VANCOUVER, BRITISH COLUMBIA, CANADA.

ANIMAL TRAP.

Application filed June 20, 1927, Serial No. 200,260, and in Canada November 15, 1926.

This invention relates to animal traps. Its object is to provide a trap of extremely simple and inexpensive construction for the purpose of trapping animals without injury to them.

The appliance may thus be used as a humane substitute for the ordinary jaw-trap, or for the purpose of securing fur animals for breeding purposes to be used as stock on fur farms and the like.

My invention consists in the following elements, a receptacle of wire mesh say of deep dish-like form having a flat-rimmed orifice which is closable by a baseboard to which it is hinged and against which it falls under the impulse of a spring.

The cage is held open against the action of the spring by a hinged lever of the second order, the lever being releasable by another lever arranged as a trigger device, the latter being in connection with a bait hook.

Figure 1:
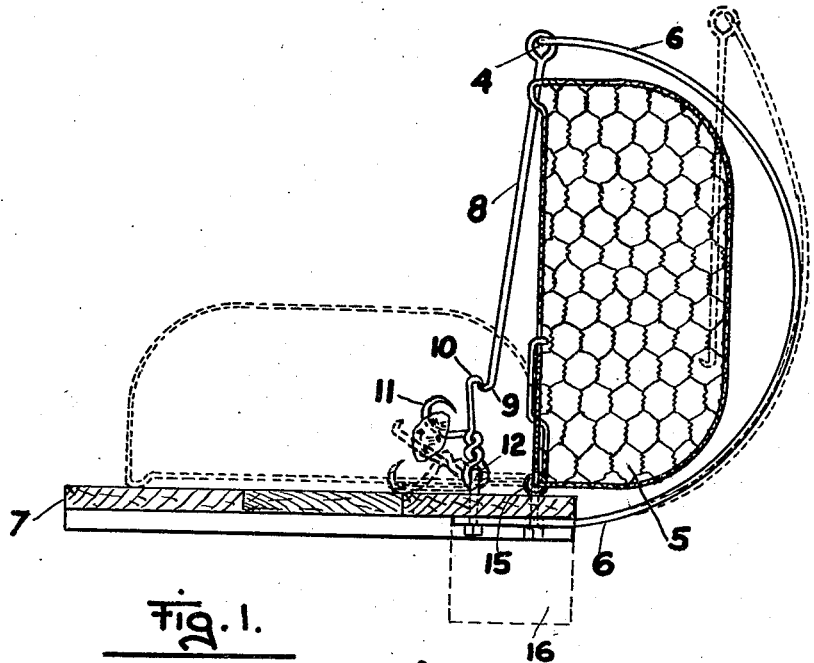
Figure 2:
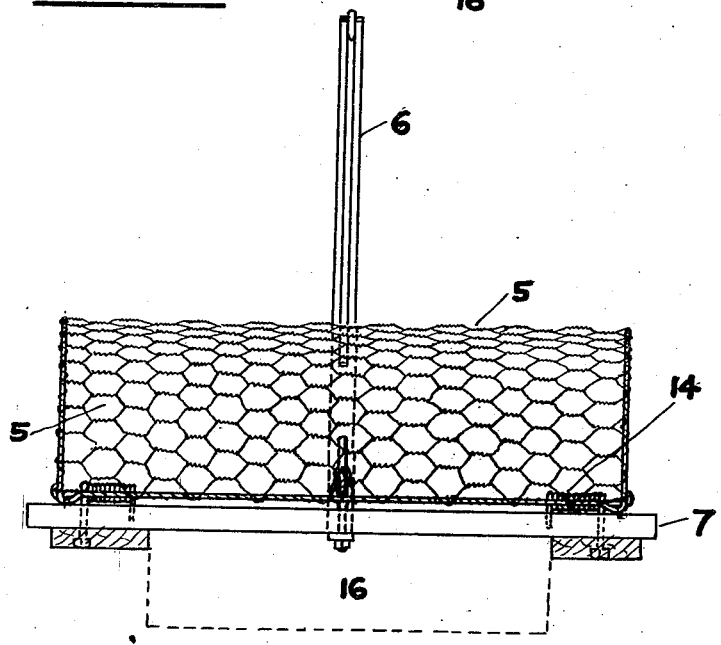

In the drawings herewith which form part of this application, Fig. 1 is a side elevation of the trap in the open position, Fig. 2 is a front elevation of Fig. 1.

Taking the drawings in detail, 5 is the wire-mesh cage, 6 a fulcrum bar or spring-bar secured to the baseboard 7, 8 a lever hingable at the fulcrum 4 and passing over the framework of the cage which it holds open at an angle of say 90 degrees from the closed position. The extremity 9 of the lever 8 is engaged by the trigger hook 10 connected to the hook ended lever 11, and forms the trigger.

The lever 11 is fulcrumed at 12 and its extremity forms the bait hook. One or more springs 14, preferably of the helical type adapted to close the cage by hinges on the same axis as that of the helix of each spring is shown anchored at 15 to the baseboard 7.

The operation of the device is readily seen by observation of the drawings. The cage 5 is raised from the position of Fig. 2 to that of Fig. 1 against the torsion of the springs 14, the hinged lever 8 meanwhile falling towards the trigger device, as shown in Fig. 1.

The end 9 of the lever 8 is then secured by the trigger hook 10 under delicate adjustment, so that any disturbance to the bait hook 11 releases it allowing it to slide back over the cage as the latter closes under the action of the powerful springs 14.

As the device functions to great advantage in shallow waters and swampy localities the baseboard is arranged with buoyancy members 16 under its heavier end. These are preferably formed of cork but any suitable material having the required buoyancy to keep the baseboard just above the water level will effect the purpose.

Having now particularly described my invention, what I desire to secure by Letters Patent, is:—

1. An animal trap comprising, a cage of wire-mesh, said cage having a flat-rimmed aperture, a baseboard adapted to close the said aperture, resilient members secured to said baseboard and to said cage and adapted to exert pressure tending to hold the rim of said aperture and the said baseboard in close contact, hinges secured to said baseboard and to said cage, a spring bar secured to said baseboard, the extremity of said bar forming a fulcrum, a lever of the second order hingeable about said fulcrum, a trigger hook in combination with a bait hook, the two said hooks being pivotable on a fulcrum adjacent the said baseboard, an eye bolt adapted to receive and act as a fulcrum for the said hooks, the extremity of the said lever engaging the said trigger hook.

2. An animal trap comprising, a cage of wire-mesh, said cage having a flat-rimmed aperture, a baseboard adapted to close the said aperture, resilient members secured to said baseboard and to said cage and adapted to exert pressure tending to hold the rim of said aperture and the said baseboard in close contact, a hinge secured to said baseboard and to said cage, a fulcrum comprising a spring bar secured to said baseboard, a lever of the second order hingeable about said fulcrum and adapted to hold the said cage in its open position, an eye bolt forming a second fulcrum secured to said baseboard, a trigger hook hingeable on said second fulcrum, the extremity of the first said lever engaging the said trigger hook, a bait hook forming a second arm of said second lever, a buoyancy member secured to said baseboard and adapted to maintain the said base board horizontally when the device is floating and in its open position.

In testimony whereof I affix my signature.

ARTHUR P. CUMMINS.